(12) United States Patent
Chen (10) Patent No.: US 11,050,451 B2
(45) Date of Patent: Jun. 29, 2021

(54) ELECTRONIC DEVICE

(71) Applicant: Egis Technology Inc., Taipei (TW)

(72) Inventor: Pin-Yu Chen, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 0 days.

(21) Appl. No.: 16/557,909

(22) Filed: Aug. 30, 2019

(65) Prior Publication Data
US 2020/0153471 A1  May 14, 2020

Related U.S. Application Data (60) Provisional application No. 62/757,300, filed on Nov. 8, 2018.

(30) Foreign Application Priority Data

Apr. 10, 2019 (CN) .......................... 201920477108.8

(51) Int. Cl.
*H04B 1/3827* (2015.01)
*H04W 52/18* (2009.01)

(52) U.S. Cl.
CPC .......... *H04B 1/3838* (2013.01); *H04W 52/18* (2013.01)

(58) Field of Classification Search
CPC .............................. H04B 1/3838; H04W 52/18
USPC ......................................................... 455/575.1
See application file for complete search history.

(56) References Cited

U.S. PATENT DOCUMENTS

| | | | |
|---|---|---|---|
| 9,374,119 B1* | 6/2016 | Chou | H04B 1/3838 |
| 9,769,769 B2 | 9/2017 | Harper et al. | |
| 9,871,545 B2 | 1/2018 | Khawand et al. | |
| 2008/0087797 A1* | 4/2008 | Turnbull | B60Q 3/258 250/206.1 |
| 2015/0162387 A1* | 6/2015 | Gu | G06F 3/0412 345/174 |
| 2015/0241925 A1* | 8/2015 | Seo | G06F 1/1681 361/679.27 |
| 2015/0242011 A1* | 8/2015 | Yeh | B32B 27/06 345/174 |
| 2016/0147263 A1* | 5/2016 | Choi | G06F 1/1626 361/679.3 |

FOREIGN PATENT DOCUMENTS

| | | |
|---|---|---|
| TW | 201528057 | 7/2015 |
| TW | I539671 | 6/2016 |
| TW | I584627 | 5/2017 |

\* cited by examiner

*Primary Examiner* — Eugene Yun (57) ABSTRACT

An electronic device is provided, including a housing, a front cover, a display panel module, a conductive structure, a circuit board, and an IC element, wherein the front cover is disposed on a front side of the electronic device and coupled to the housing. The conductive structure is disposed on the front cover and located outside an active display region of the display panel module. The IC element is disposed on the circuit board and electrically coupled to the conductive structure. When a human body is approaching to the front cover, the conductive structure generates an electrical signal to the IC element.

18 Claims, 9 Drawing Sheets

ELECTRONIC DEVICE

CROSS REFERENCE TO RELATED APPLICATIONS

This application claims the benefit of U.S. Provisional Application No. 62/757,300, filed on Nov. 8, 2018, and claims priority of China Patent Application No. 201920477108.8, filed on Apr. 10, 2019, the entirety of which are incorporated by reference herein.

BACKGROUND OF THE INVENTION

Field of the Invention

The invention relates to an electronic device, and more particularly to an electronic device that has a conductive structure formed on the front cover thereof.

Description of the Related Art

Figure 1:
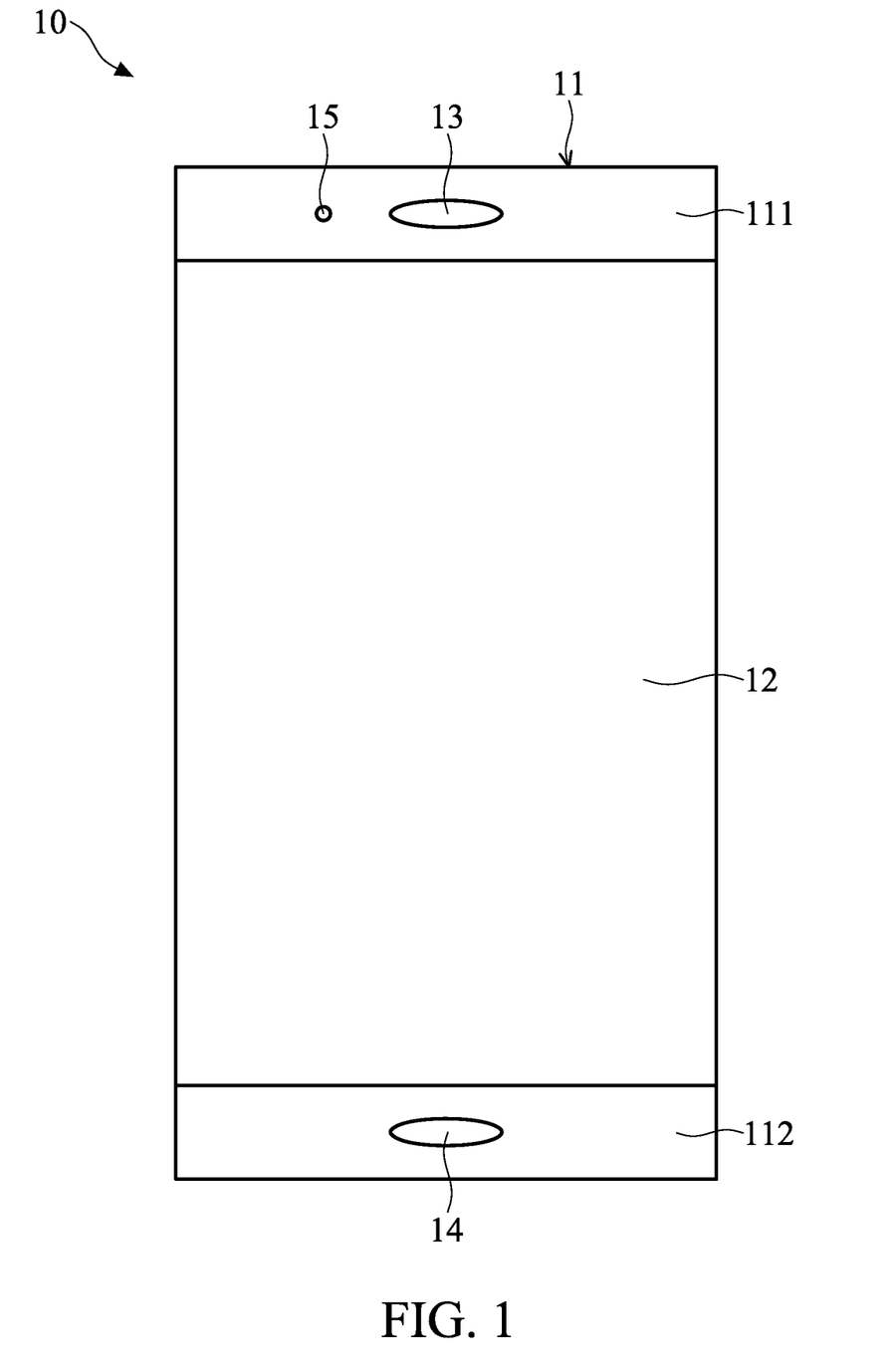
FIG. 1 is a front view of a conventional cell phone 10.

FIG. 1 is a front view of a conventional cell phone 10. Referring to FIG. 1, the upper and lower parts 111 and 112 of a housing 11 and a screen 12 between the upper and lower parts 111 and 112 usually can be seen on the front side of the conventional cell phone 10, wherein the screen 12 can be used to display digital images. Moreover, a speaker 13 and a microphone 14 are respectively provided inside the upper and lower parts 111 and 112 of the housing 11, so that the user can hold the cell phone 10 to answer a phone call and engage in conversation via the speaker 13 and the microphone 14.

A conventional cell phone 10 may be provided with a proximity sensor to detect if an object is approaching to the cell phone 10. For example, the proximity sensor may be an infrared sensor that can transmit and receive an infrared signal via a sensing hole 15 on the upper part 111 of the housing 11, so that the face of the user can be detected when it is approaching to the cell phone 10. Once the face of the user is approaching to cell phone 10 and detected by the proximity sensor, he/she is deemed to be on the phone with someone, and the screen 12 can be automatically turned off to save battery power.

However, a conventional optical proximity sensor may cause the production cost to increase, and the aesthetic appearance suffers, owing to the sensing hole 15 on the upper part 111 of the housing 11.

BRIEF SUMMARY OF THE INVENTION

An electronic device is provided, including a housing, a front cover coupled to the housing, a display panel module, a conductive structure, a circuit board, a processor, and an IC element disposed on the circuit board. The housing and the front cover define an accommodating space, and the display panel module is disposed in the accommodating space to generate a digital image. The conductive structure is disposed on the front cover and located outside an active display region of the display panel module. The circuit board is disposed in the accommodating space and located between the display panel module and a bottom portion of the housing. The processor is disposed on the circuit board, and the IC element is electrically coupled to the conductive structure and the processor. Specifically, the conductive structure is configured to generate an electrical signal to the IC element when a human body is approaching to the front cover, and the IC element is configured to transmit a sensing signal to the processor when the electrical signal exceeds a threshold value.

In some embodiments, the front cover comprises a first area, a second area, and a third area between the first and second areas, the first and second areas are located outside the active display region of the display panel module, and the third area is located corresponding to the active display region.

In some embodiments, the electronic device further includes a speaker, wherein the conductive structure and the speaker are located in the first area.

In some embodiments, the electronic device further includes a microphone, wherein the conductive structure and the microphone are located in the second area.

In some embodiments, the front cover comprises light-permeable material covering the display panel module.

In some embodiments, the front cover comprises a touch control glass, and the display panel module comprises a TFT-LCD or OLED panel module.

In some embodiments, the conductive structure is disposed on an inner surface of the front cover.

In some embodiments, the conductive structure comprises metal, conductive ink, or light-permeable conductive material.

In some embodiments, the conductive structure extends from an inner surface of the front cover to an outer surface of the front cover.

In some embodiments, the conductive structure has a C-shaped cross-section.

In some embodiments, the IC element comprises a Specific Absorption Rate sensor.

In some embodiments, the IC element detects electromagnetic waves near the electronic device.

In some embodiments, the IC element comprises a capacity sensor.

In some embodiments, the electronic device further includes a pogo pin connector electrically coupled to the conductive structure and the IC element.

In some embodiments, when the electrical signal exceeds a threshold value, the processor transmits a control signal to the display panel module to turn off the display panel module.

In some embodiments, the conductive structure is formed on the front cover by chemical vapor deposition, evaporation, sputtering, coating, dispensing, electroplating, or In some embodiments, the electronic device further includes a speaker close to the conductive structure.

In some embodiments, the front cover comprises a first area, a second area, and a third area between the first and second areas, wherein the first and second areas are located outside the active display region of the display panel module, and the third area is located corresponding to the active display region, wherein the conductive structure is located between the speaker and the third area.

In some embodiments, the electronic device further includes a microphone close to the conductive structure.

In some embodiments, the front cover comprises a first area, a second area, and a third area between the first and second areas, wherein the first and second areas are located outside the active display region of the display panel module, and the third area is located corresponding to the active display region, wherein the conductive structure is located between the microphone and the third area.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The embodiments of an electronic device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 2:
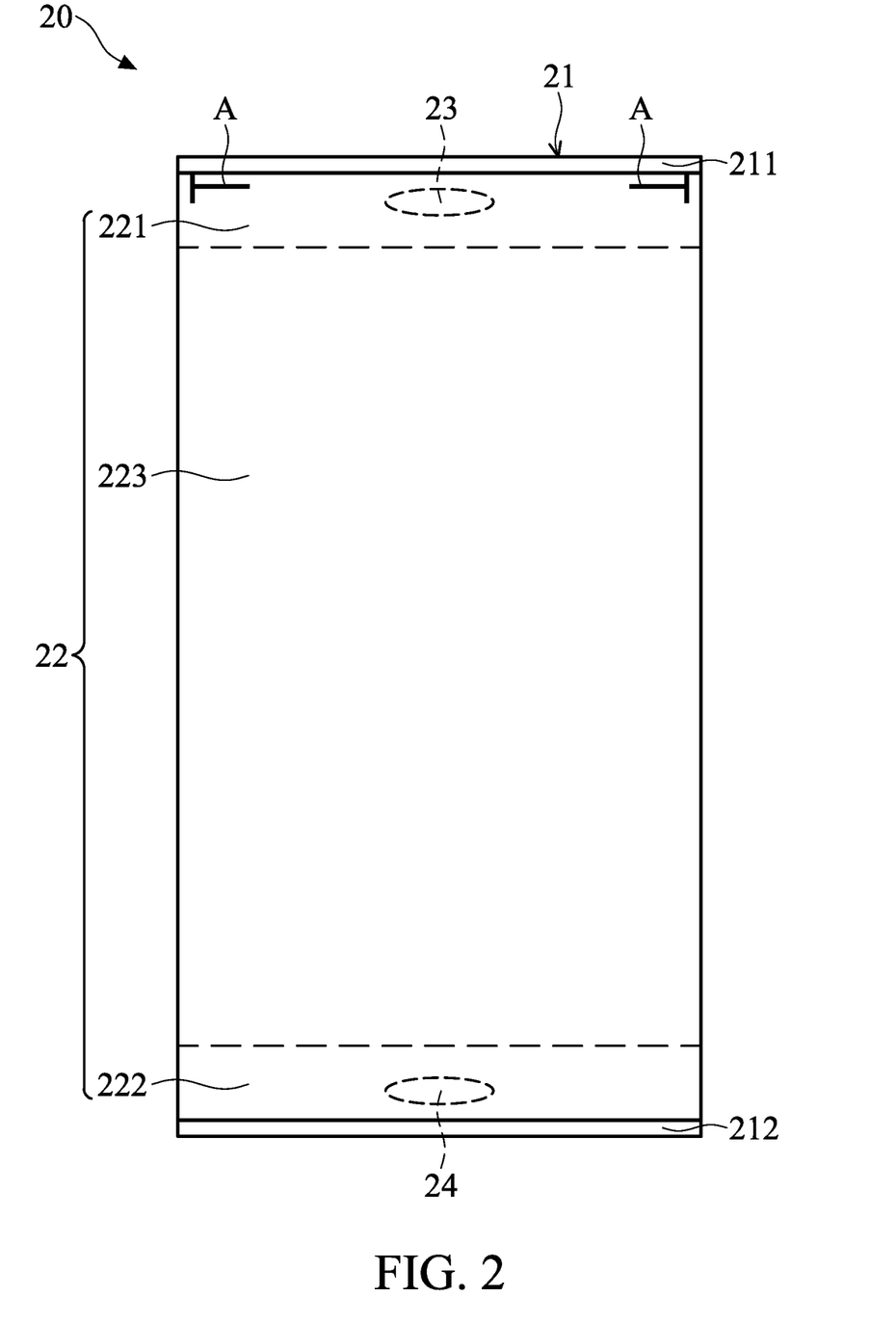
FIG. 2 shows a front view of an electronic device 20 in accordance with an embodiment of the invention.
Figure 3:
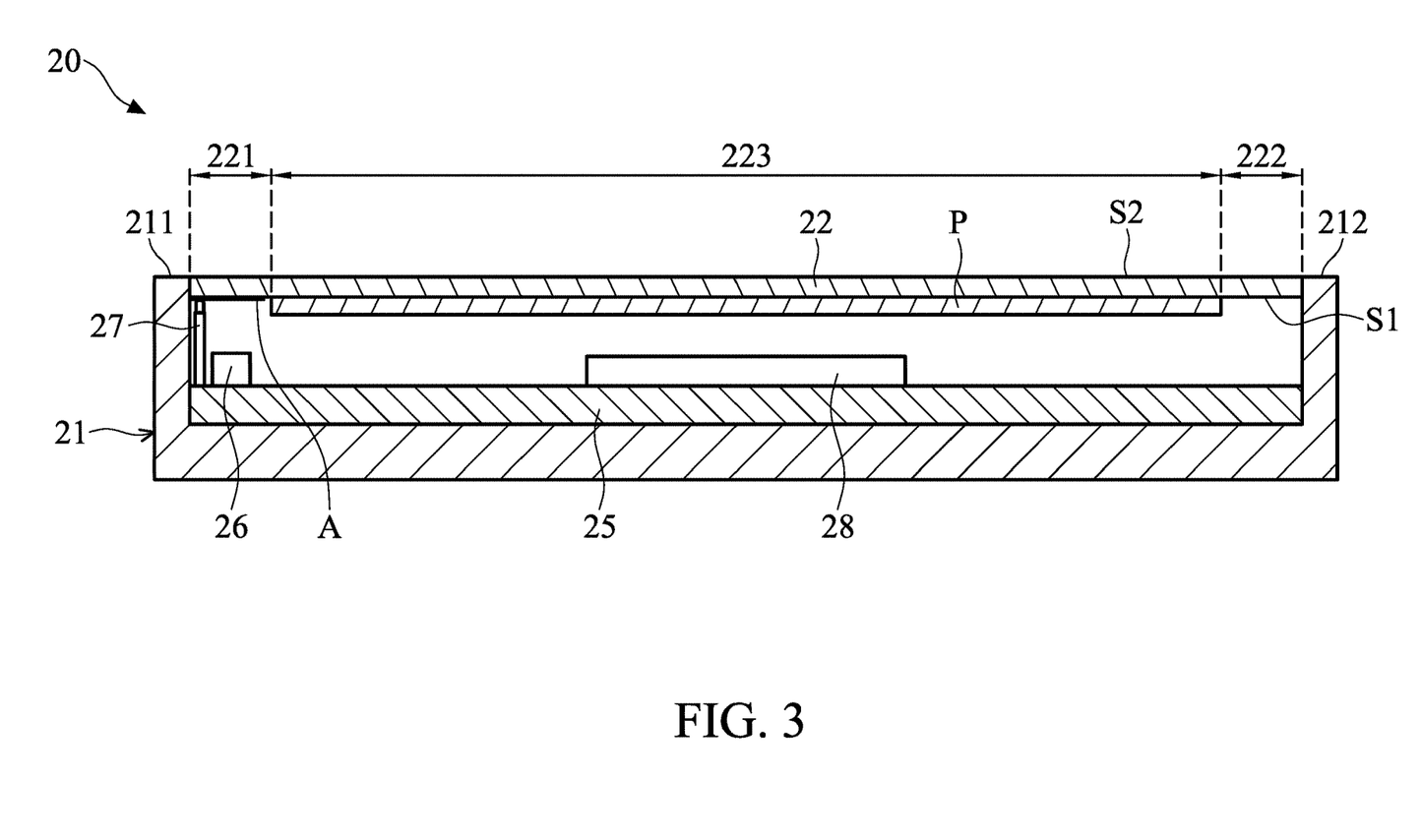
FIG. 3 shows a cross-sectional view of the electronic device 20 of FIG. 2.

FIG. 2 shows a front view of an electronic device 20 in accordance with an embodiment of the invention, and FIG. 3 shows a cross-sectional view of the electronic device 20 of FIG. 2, wherein the electronic device 20 may be a cell phone or a tablet computer. As shown in FIGS. 2 and 3, the upper and lower parts 211 and 212 of the housing 21 and a front cover 22 between the upper and lower parts 211 and 212 can be seen on the front side of the electronic device 20. Specifically, the housing 21 and the front cover 22 are coupled to each other and form an accommodating space for receiving a display panel module P and a circuit board 25 (FIG. 3). In some embodiments, the display panel module P may be an OLED or TFT-LCD panel module.

The front cover 22 may comprise a touch glass that is made of light-permeable conductive material and covers the upper surface of the display panel module P (FIG. 3). In some embodiments, a touch control circuit is provided on the lower side of the display panel module P, whereby the user can place a finger on the front cover 22 to perform click or drag and drop operation.

Here, the front cover 22 comprises a first area 221, a second area 222, and a third area 223 between the first and second areas 221 and 222. The third area 223 is located corresponding to an active display region of the display panel module P, and the first and second areas 221 and 222 are located outside the active display region of the display panel module P.

As shown in FIG. 2, a speaker 23 and a conductive structure A are disposed in the first area 221, and a microphone 24 is disposed in the second area 222. When the user would like to answer a phone call, he/she can hold the electronic device 20 and conduct a conversation with others via the speaker 23 and the microphone 24.

Referring to FIG. 3, the display panel module P is disposed in an accommodating space formed by the housing 21 and the front cover 22. It should be noted that the display panel module P can emit light to pass through the front cover 22 to display a digital image. Specifically, the conductive structure A may comprise metal, conductive ink, or light-permeable conductive material, and it can be used as a sensing antenna for object detection. In some embodiments, the conductive structure A may be formed on the inner surface S1 of the front cover 22 by chemical vapor deposition, evaporation, sputtering, coating, dispensing, electroplating, or electroless plating. For example, the conductive structure A may comprise Indium Tin Oxide (ITO) and is coated on the inner surface S1 of the front cover 22.

Still referring to FIG. 3, the circuit board 25 is disposed in the accommodating space formed by the housing 21 and the front cover 22. In this embodiment, the circuit board 25 is located between the display panel module P and a bottom portion of the housing 21. It should be noted that an IC element 26, an electrical connector 27, and a processor 28 are all coupled to the circuit board 25. In some embodiments, the electrical connector 27 may be a pogo pin connector that is electrically coupled to the conductive structure A and the output port (TX pin) and/or input port (RX pin) of the IC element 26, and the IC element 26 is electrically coupled to the processor 28 via the circuit board 25.

When a human body (i.e. the user) approaches the front cover 22 on the front side of the electronic device 20, the electric field near the conductive structure A is influenced, so that an electrical signal can be generated and transmitted from the conductive structure A to the IC element 26. Once the electrical signal exceeds a threshold value, the IC element 26 transmits a sensing signal to the processor 28, and the processor 28 can transmit a control signal to the display panel module P according to the sensing signal, thereby turning off the display panel module P to reduce power consumption of the electronic device 20.

In some embodiments, the IC element 26 may comprise a capacity sensor or a Specific Absorption Rate (SAR) sensor. Therefore, the conventional optical proximity sensor and the sensing hole 15 shown in FIG. 1 can be omitted from the electronic device 20 to reduce production cost and improve the aesthetic appearance. Since the IC element 26 (e.g. SAR sensor) can monitor the electric field and the electromagnetic waves near the electronic device 20, excessive electromagnetic exposure of the users can be efficiently avoided. Moreover, as the display panel module P can be automatically turned off when the user is using the phone, power consumption of the electronic device 20 can be greatly reduced.

Figure 4:
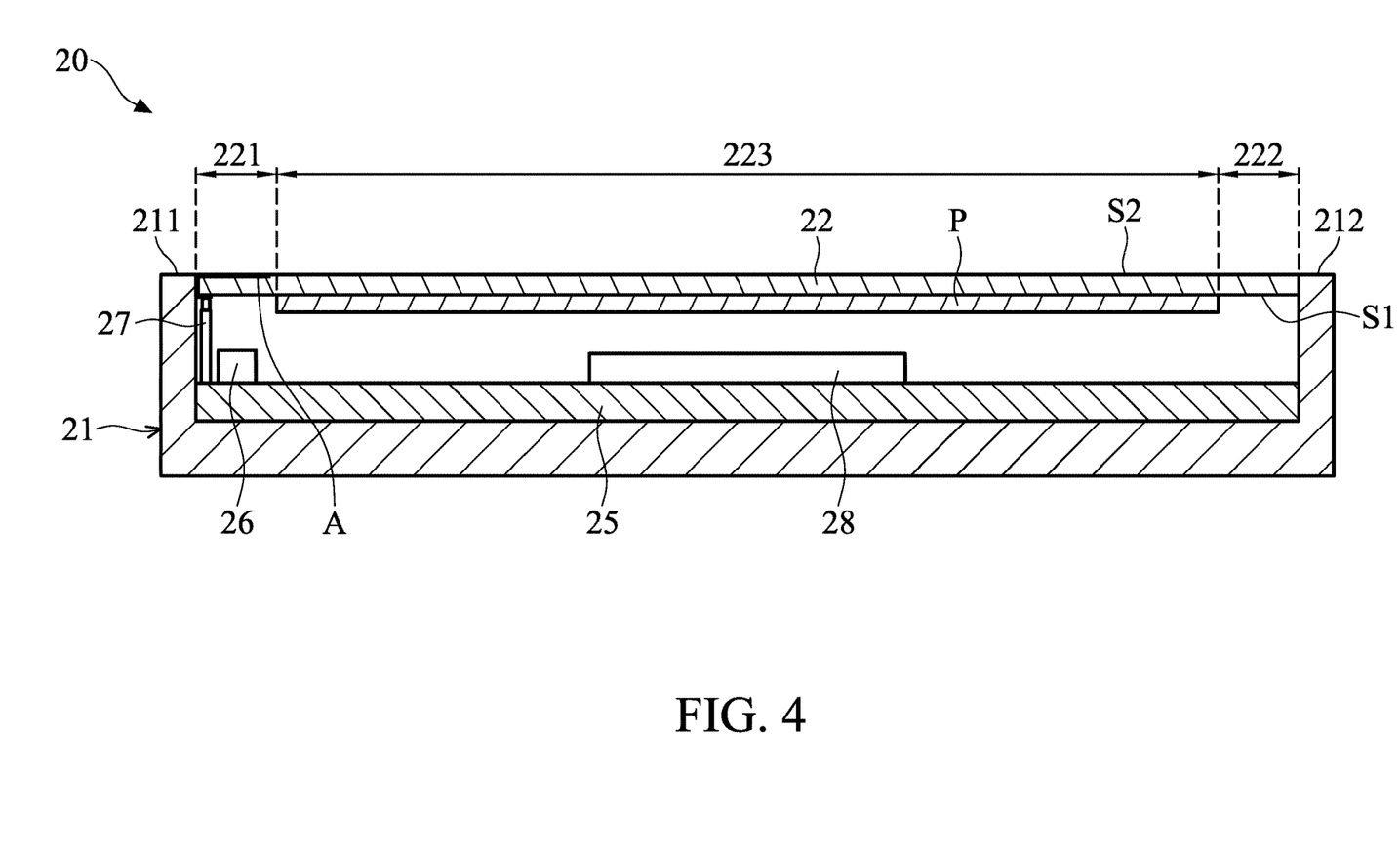
FIG. 4 shows a cross-sectional view of an electronic device 20 in accordance with another embodiment of the invention.

FIG. 4 shows a cross-sectional view of an electronic device 20 in accordance with another embodiment of the invention. Referring to FIG. 4, the conductive structure A in this embodiment has a C-shaped cross-section and extends from the inner surface S1 to the outer surface S2 of the front cover 22. Here, the conductive structure A may comprise metal, conductive ink, or light-permeable conductive material. In some embodiments, the conductive structure A may be formed on the inner and outer surfaces S1 and S2 of the front cover 22 by chemical vapor deposition, evaporation, sputtering, coating, dispensing, electroplating, or electroless plating.

Figure 5:
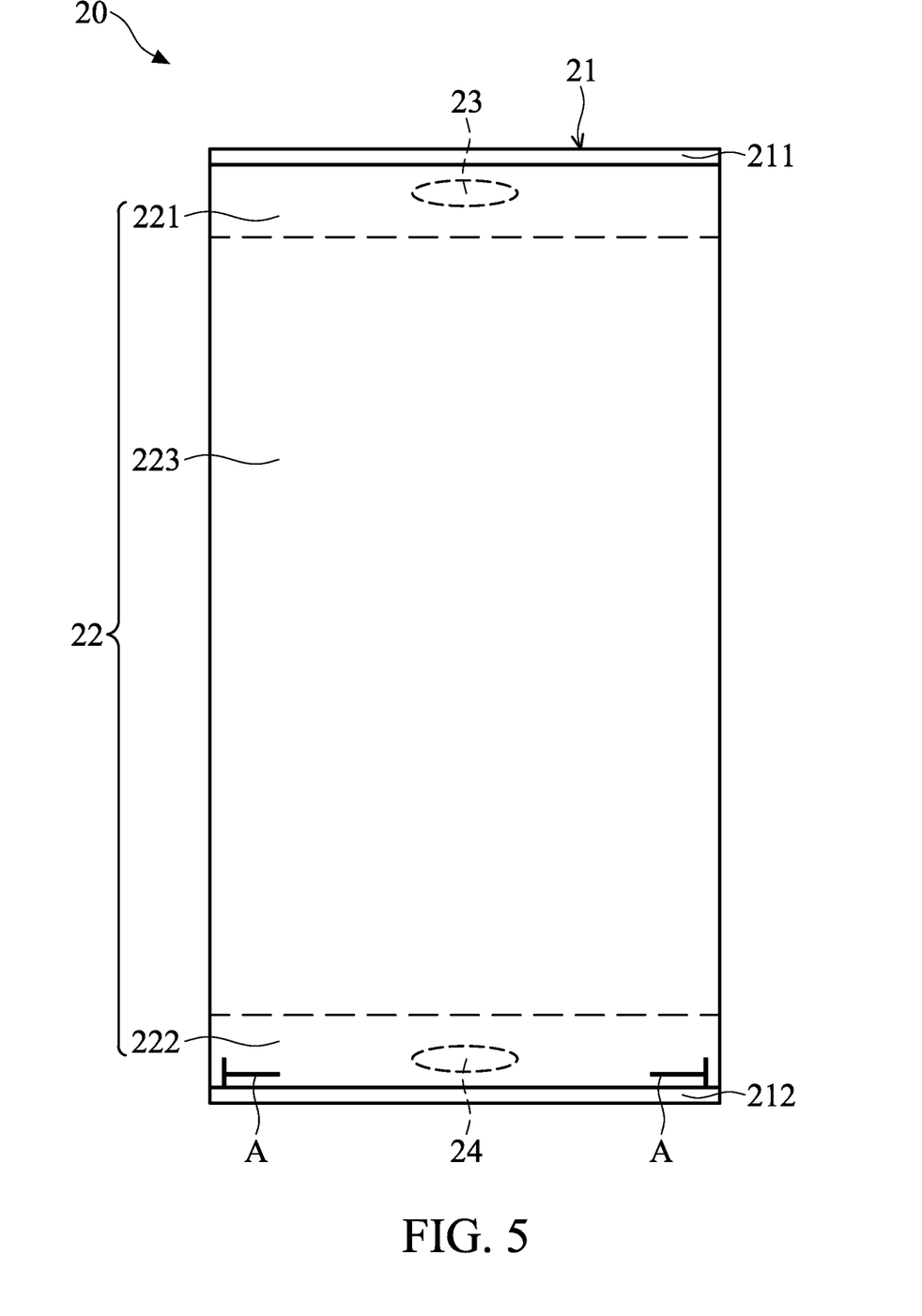
FIG. 5 shows a front view of an electronic device 20 in accordance with another embodiment of the invention.
Figure 6:
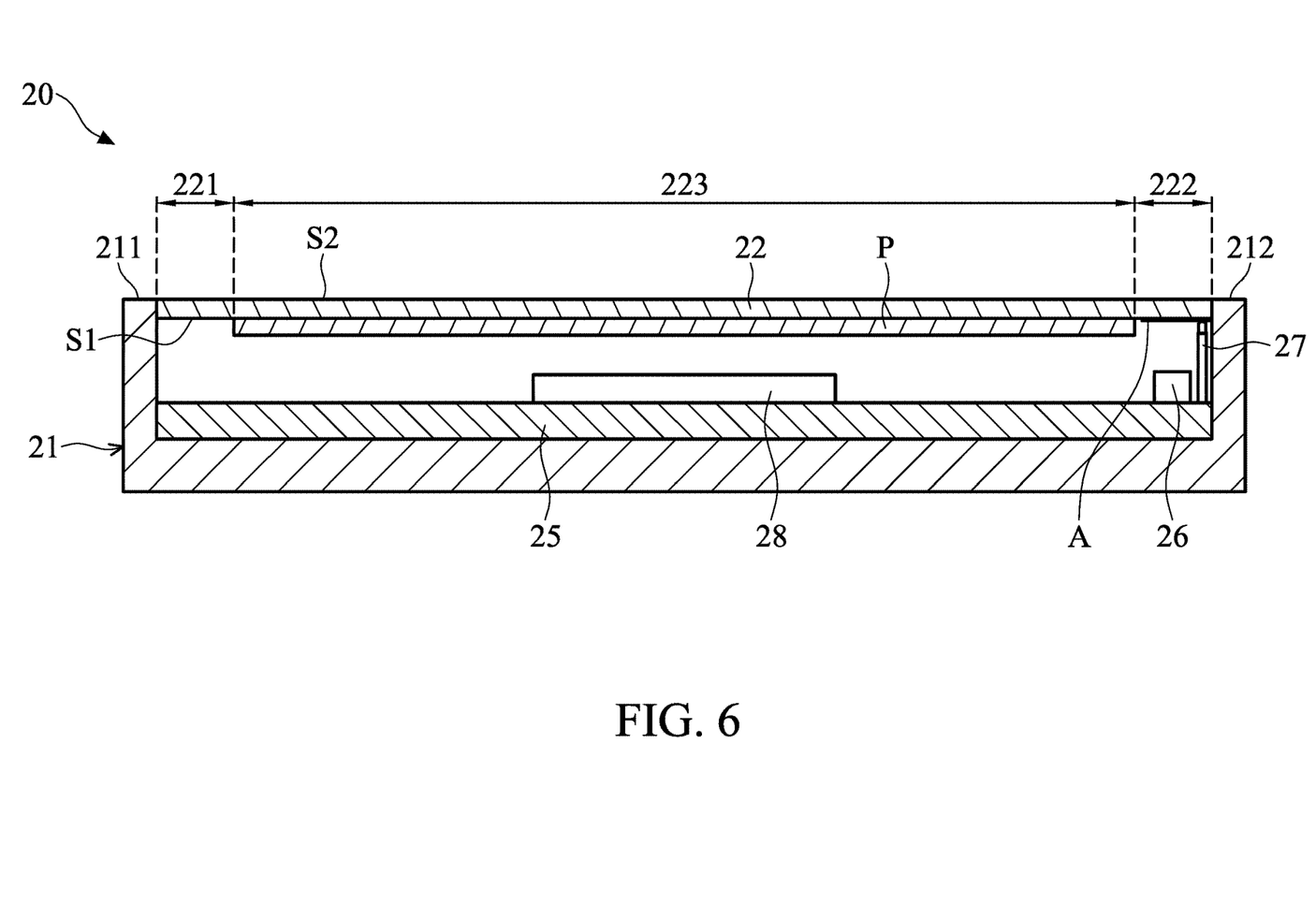
FIG. 6 shows a cross-sectional view of the electronic device 20 of FIG. 5.

FIG. 5 shows a front view of an electronic device 20 in accordance with another embodiment of the invention, and FIG. 6 shows a cross-sectional view of the electronic device 20 of FIG. 5. Referring to FIGS. 5 and 6, a speaker 23 is disposed in the first area 221 of the front cover 22, and a microphone 24 and at least a conductive structure A are disposed in the second area 222 of the front cover 22. When the user would like to answer a phone call, he/she can hold the electronic device 20 and have a conversation with others via the speaker 23 and the microphone 24.

As mentioned above, when the user approaches the front cover 22 on the front side of the electronic device 20, the electric field near the conductive structure A is influenced, so that an electrical signal can be generated and transmitted from the conductive structure A to the IC element 26. If the electrical signal exceeds a threshold value, the IC element 26 transmits a sensing signal to the processor 28, and the processor 28 can transmit a control signal to the display panel module P according to the sensing signal, thereby turning off the display panel module P to reduce power consumption of the electronic device 20.

Figure 7:
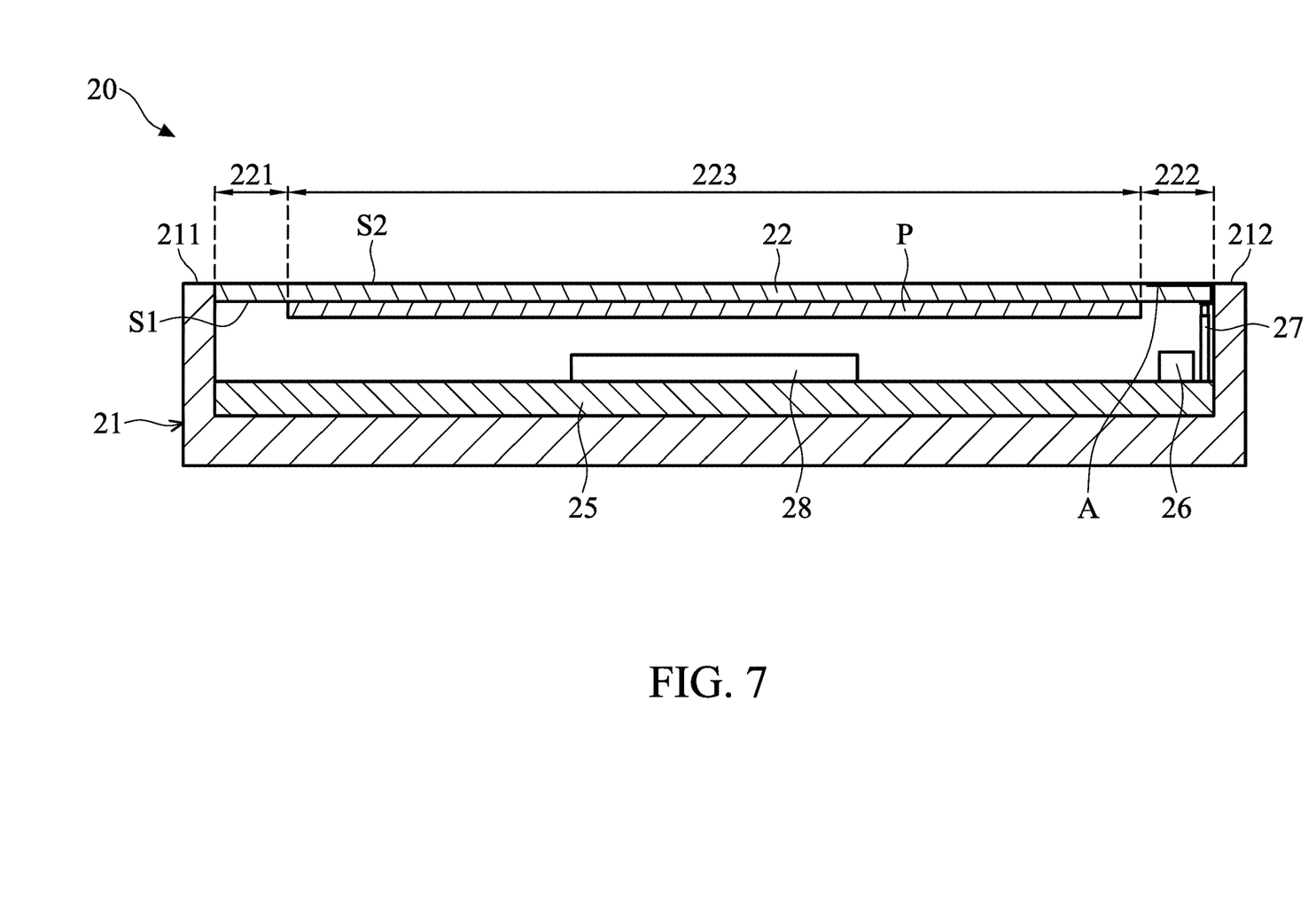
FIG. 7 shows a cross-sectional view of the electronic device 20 in accordance with another embodiment of the invention.

As shown in FIG. 6, the conductive structure A can be used as a sensing antenna, and it is formed only on the inner surface S1 of the front cover 22. However, as shown in FIG. 7, another embodiment of the conductive structure A may have a C-shaped cross-section and extend from the inner surface S1 to the outer surface S2 of the front cover 22.

Figure 8:
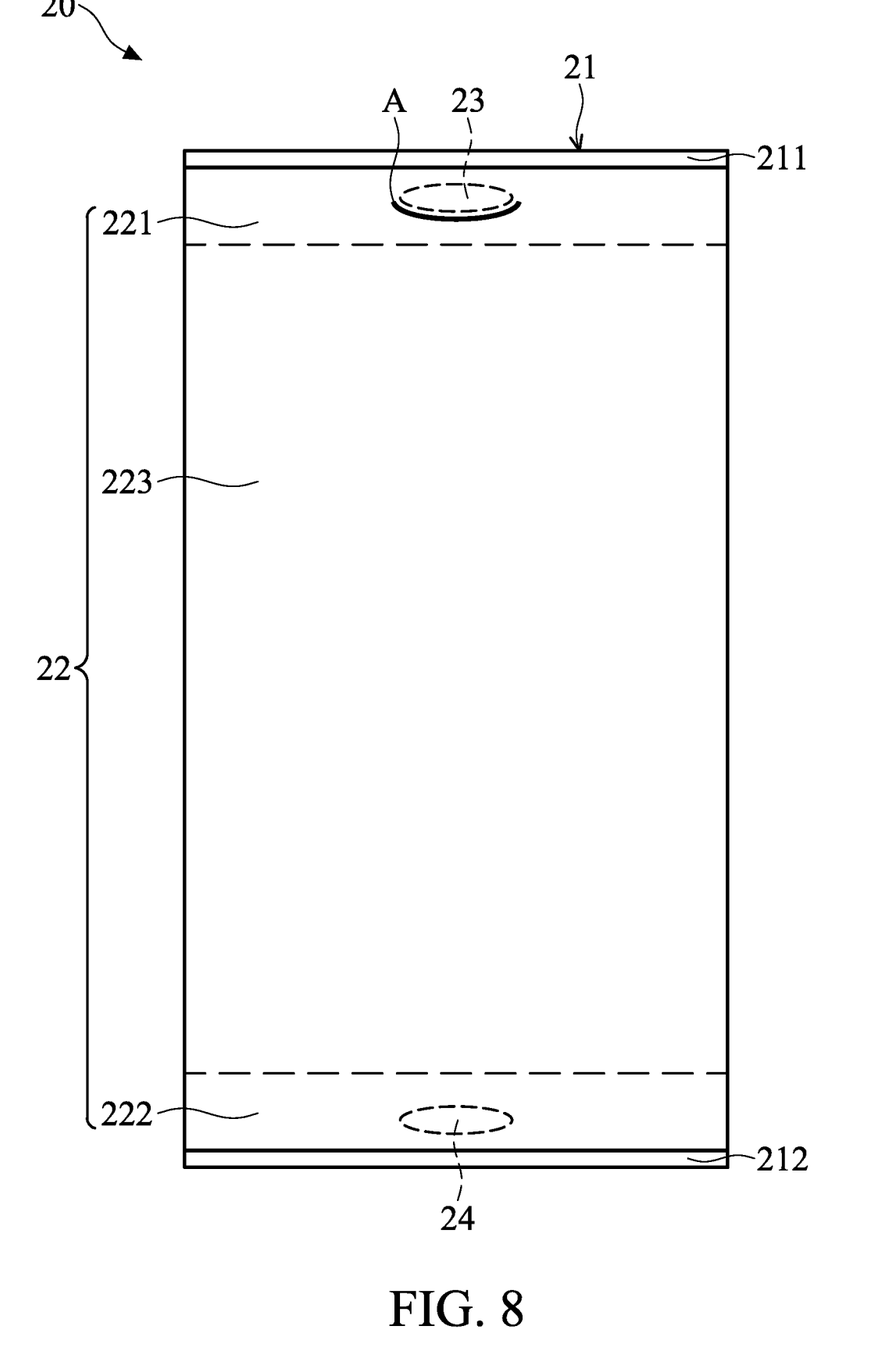
FIG. 8 is a front view showing a conductive structure A close to a speaker 23 of an electronic device 20 in accordance with another embodiment of the invention.
Figure 9:
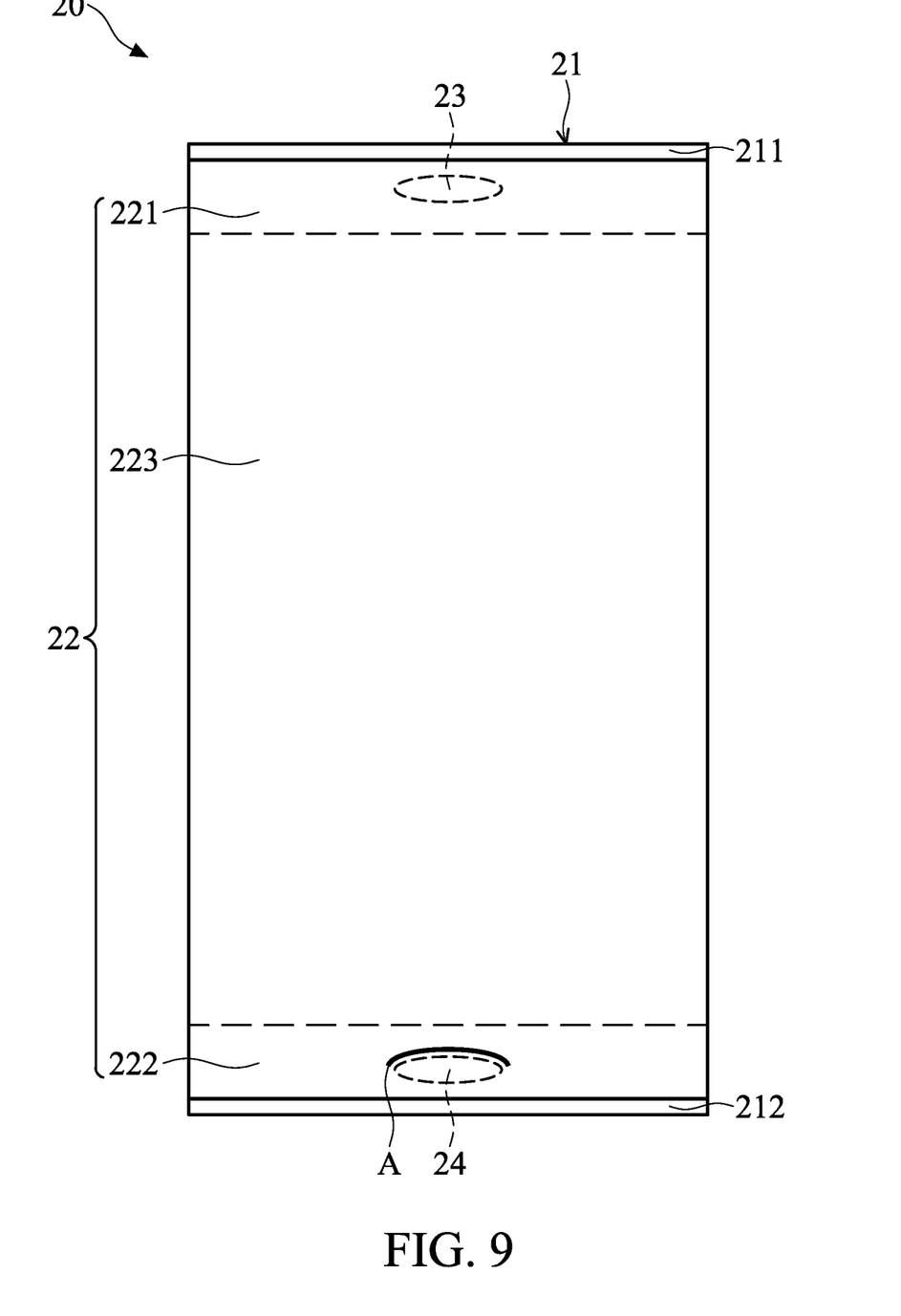
FIG. 9 is a front view showing a conductive structure A close to a microphone 24 of an electronic device 20 in accordance with another embodiment of the invention.

FIG. 8 is a front view showing a conductive structure A close to a speaker 23 of an electronic device 20 in accordance with another embodiment of the invention. FIG. 9 is a front view showing a conductive structure A close to a microphone 24 of an electronic device 20 in accordance with another embodiment of the invention. Referring to the two embodiments of FIGS. 8 and 9, the conductive structure A may be disposed in the first area 221 or the second area 222 of the front cover 22, and located close to the speaker 23 or the microphone 24 of the electronic device 20. In the embodiment of FIG. 8, the conductive structure A has a curved shape close to the speaker 23, and it is located between the speaker 23 and the third area 223. In the embodiment of FIG. 9, the conductive structure A has a curved shape close to the microphone 24, and it is located between the microphone 24 and the third area 223.

In summary, the invention provides an electronic device 20 having a conductive structure A formed on the front cover 22, so as to detect the user when he/she is approaching to the front side of the electronic device 20. When a human body (e.g. the user) approaches the front cover 22 on the front side of the electronic device 20, the electric field near the conductive structure A is influenced, so that an electrical signal is generated and transmitted from the conductive structure A to an IC element 26. If the electrical signal exceeds a threshold value, the IC element 26 transmits a sensing signal to the processor 28, and the processor 28 can transmit a control signal to the display panel module P according to the sensing signal, thereby turning off the display panel module P to reduce power consumption of the electronic device 20.

In some embodiments, the IC element 26 may comprise a Specific Absorption Rate (SAR) sensor to monitor the electric field and the electromagnetic waves near the electronic device 20, so that excessive electromagnetic exposure of the users can be efficiently avoided. Therefore, the conventional optical proximity sensor and the sensing hole 15 can be omitted from the electronic device 20, to reduce production cost and improve the aesthetic appearance. Moreover, since the display panel module P can be automatically turned off when the user is using the phone, power consumption of the electronic device 20 can also be reduced.

It should be noted that when IC element 26 comprises a Specific Absorption Rate (SAR) sensor, the length of the conductive structure A (sensing antenna) can be flexibly adjusted to define a suitable sensing distance. Similarly, the gain and the threshold value of the IC element 26 can also be adjusted to define a suitable sensing distance, thus increasing the flexibility of use.

For example, when the conductive structure A (sensing antenna) has a length of 3.5 cm, the effective sensing distance is about 7 cm. When the conductive structure A has a length of 1.7 cm, the effective sensing distance is about 3 cm. That is, the length of the conductive structure A can be appropriately designed to meet the needs of the users and suitable for the space inside the electronic device. Similarly, the effective sensing distance of the conductive structure A can also be altered by adjusting the gain or the threshold value of the IC element 26.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a housing;
   a front cover coupled to the housing, wherein the housing and the front cover define an accommodating space;
   a display panel module, disposed in the accommodating space to generate a digital image;
   a conductive structure, located outside an active display region of the display panel module, wherein the conductive structure is formed on an inner surface of the front cover by chemical vapor deposition, evaporation, sputtering, coating, dispensing, electroplating, or electroless plating;
   a circuit board, disposed in the accommodating space and located between the display panel module and a bottom portion of the housing;
   a processor, disposed on the circuit board, and
   an IC element disposed on the circuit board, electrically coupled to the conductive structure and the processor;
   wherein the conductive structure is configured to generate an electrical signal to the IC element when a human body is approaching to the front cover, and the IC element is configured to transmit a sensing signal to the processor when the electrical signal exceeds a threshold value.

2. The electronic device as claimed in claim 1, wherein the front cover comprises a first area, a second area, and a third area between the first and second areas, the first and second areas are located outside the active display region of the display panel module, and the third area is located corresponding to the active display region.

3. The electronic device as claimed in claim 2, further comprising a speaker, wherein the conductive structure and the speaker are located in the first area.

4. The electronic device as claimed in claim 2, further comprising a microphone, wherein the conductive structure and the microphone are located in the second area.

5. The electronic device as claimed in claim 2, wherein the front cover comprises light-permeable material covering the display panel module.

6. The electronic device as claimed in claim 5, wherein the front cover comprises a touch control glass, and the display panel module comprises a TFT-LCD or OLED panel module.

7. The electronic device as claimed in claim 5, wherein the conductive structure comprises metal, conductive ink, or light-permeable conductive material.

8. The electronic device as claimed in claim 5, wherein the conductive structure extends from an inner surface of the front cover to an outer surface of the front cover.

9. The electronic device as claimed in claim 8, wherein the conductive structure has a C-shaped cross-section.

10. The electronic device as claimed in claim 1, wherein the IC element comprises a Specific Absorption Rate sensor.

11. The electronic device as claimed in claim 10, wherein the IC element detects electromagnetic waves near the electronic device.

12. The electronic device as claimed in claim 1, wherein the IC element comprises a capacity sensor.

13. The electronic device as claimed in claim 1, further comprising a pogo pin connector electrically coupled to the conductive structure and the IC element.

14. The electronic device as claimed in claim 1, wherein when the electrical signal exceeds a threshold value, the processor transmits a control signal to the display panel module to turn off the display panel module.

15. The electronic device as claimed in claim 1, further comprising a speaker close to the conductive structure.

16. The electronic device as claimed in claim 15, wherein the front cover comprises a first area, a second area, and a third area between the first and second areas, wherein the first and second areas are located outside the active display region of the display panel module, and the third area is located corresponding to the active display region, wherein the conductive structure is located between the speaker and the third area.

17. The electronic device as claimed in claim 1, further comprising a microphone close to the conductive structure.

18. The electronic device as claimed in claim 17, wherein the front cover comprises a first area, a second area, and a third area between the first and second areas, wherein the first and second areas are located outside the active display region of the display panel module, and the third area is located corresponding to the active display region, wherein the conductive structure is located between the microphone and the third area.

* * * * *